United States Patent
Cho et al.

(10) Patent No.: US 7,492,420 B2
(45) Date of Patent: *Feb. 17, 2009

(54) ARRAY SUBSTRATE FOR LCD DEVICE HAVING METAL-DIFFUSION FILM AND MANUFACTURING METHOD THEREOF

(75) Inventors: Won-Ho Cho, Gumi-si (KR); Gyoo-Chul Jo, Gunpo-si (KR); Gue-Tai Lee, Yeongcheon-si (KR); Jin-Gyu Kang, Incheon (KR); Beung-Hwa Jeong, Gumi-si (KR); Jin-Young Kim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/010,753

(22) Filed: Jan. 29, 2008

(65) Prior Publication Data

US 2008/0129943 A1 Jun. 5, 2008

Related U.S. Application Data

(62) Division of application No. 10/875,986, filed on Jun. 25, 2004, now Pat. No. 7,352,417.

(30) Foreign Application Priority Data

Jun. 30, 2003 (KR) ............... 10-2003-0043962

(51) Int. Cl.
*G02F 1/136* (2006.01)
(52) U.S. Cl. ........................... 349/43; 257/59
(58) Field of Classification Search ............ None
See application file for complete search history.

(56) References Cited

U.S. PATENT DOCUMENTS

| 5,162,933 | A | 11/1992 | Kakuda et al. |
| 6,043,511 | A | 3/2000 | Kim |
| 6,091,464 | A | 7/2000 | Song |
| 6,255,706 | B1 | 7/2001 | Watanabe et al. |
| 6,586,287 | B2 | 7/2003 | Joo et al. |
| 2001/0030717 | A1 | 10/2001 | Kaneko et al. |
| 2002/0081847 | A1 | 6/2002 | Jo et al. |
| 2002/0117691 | A1 | 8/2002 | Choi et al. |

*Primary Examiner*—David Nelms
*Assistant Examiner*—Lucy P Chien
(74) *Attorney, Agent, or Firm*—McKenna Long & Aldridge LLP

(57) ABSTRACT

The present invention is an array substrate for use in a liquid crystal display device, which includes a gate electrode, a gate line and a gate pad electrode on a substrate, wherein all of the gate electrode, the gate line and the gate pad electrode have a first barrier metal layer, a first copper layer, and a first out-diffusion film that covers and surrounds the first copper layer. In the liquid crystal display device, the pixel electrode, gate pad terminal and data pad terminal are formed of a transparent conductive material on a passivation layer.

10 Claims, 28 Drawing Sheets

ARRAY SUBSTRATE FOR LCD DEVICE HAVING METAL-DIFFUSION FILM AND MANUFACTURING METHOD THEREOF

This application is a divisional application of application Ser. No. 10/875,986 filed Jan. 25, 2004 now U.S. Pat. No. 7,352,417 which claims the benefit of Korean Application No. 10-2003-0043962 filed Jun. 30, 2003, which are hereby incorporated by references for all purposes as if fully set forth herein.

BACKGROUND OF THE INVENTION

1. Field of the Invention

The present invention relates to a liquid crystal display (LCD) device, and more particularly, to an array substrate having a double-layered structure with a molybdenum-diffused film.

2. Discussion of the Related Art

In general, because flat panel display devices are thin, light weight, and have low power consumption, they are frequently used as displays for portable devices. Among the various types of flat panel display devices, liquid crystal display (LCD) devices are widely used for laptop computers and desktop monitors because of their superiority in resolution, color image display, and display quality.

LCD devices use the optical anisotropy and polarization properties of liquid crystal molecules to produce a desired image. Liquid crystal molecules have a definite inter-molecular orientation that results from their peculiar characteristics. The specific orientation can be modified by an electric field that is applied across the liquid crystal molecules. In other words, electric fields applied across the liquid crystal molecules can change the orientation of the liquid crystal molecules. Due to optical anisotropy, incident light is refracted according to the orientation of the liquid crystal molecules.

Specifically, the LCD devices have upper and lower substrates with electrodes that are spaced apart and face each other, and a liquid crystal material is interposed therebetween. Accordingly, when a voltage is applied to the liquid crystal material by the electrodes of each substrate, an alignment direction of the liquid crystal molecules is changed in accordance with the applied voltage to display images. By controlling the applied voltage, the LCD device provides various transmittances for rays of light to display image data.

The liquid crystal display (LCD) devices have wide application in office automation (OA) and video equipment because of their light weight, thin design, and low power consumption characteristics. Among the different types of LCD devices, active matrix LCDs (AM-LCDs), which have thin film transistors and pixel electrodes arranged in a matrix form, offer high resolution and superiority in displaying moving images. A typical LCD panel has an upper substrate, a lower substrate and a liquid crystal material layer interposed therebetween. The upper substrate, commonly referred to as a color filter substrate, includes a common electrode and color filters. The lower substrate, commonly referred to as an array substrate, includes switching elements, such as thin film transistors (TFT's), and pixel electrodes, for example.

As previously described, operation of an LCD device is based on the principle that the alignment direction of the liquid crystal molecules is dependent upon an applied electric field between the common electrode and the pixel electrode. Accordingly, the liquid crystal molecules function as an optical modulation element having variable optical characteristics that depend upon polarity of the applied voltage.

FIG. 1 is a partially enlarged plan view of an exemplary array substrate according to a related art. As illustrated, gate lines 33 are disposed in a transverse direction and data lines 53 are disposed in a longitudinal direction. The data lines 53 cross the gate lines 33 substantially perpendicularly such that the crossing of the gate and data lines 33 and 53 defines a matrix of pixel regions P. A switching device such as a thin film transistor T is disposed in each pixel region P near a crossing of the gate and data lines 33 and 53. A gate pad electrode 35 is formed at the end of each gate line 33. This gate pad electrode 35 is wider than the gate line 33. A data pad electrode 55 is formed at the end of each data line 53, and similarly is wider than the data line 53. On each gate pad electrode 35, a gate pad terminal 71 is formed of a transparent and electrically conductive material. A data pad terminal 73 of transparent conductive material is likewise formed on each data pad electrode 55. The gate and data pad terminals 71 and 73 receive electrical signals from the external driving circuits.

In each pixel region P, a pixel electrode 69 is disposed so as to come into contact with the thin film transistor T. A storage capacitor $C_{ST}$ is also formed in a portion of each pixel region P. In each pixel region P in this example, the storage capacitor $C_{ST}$ is formed over the gate line 33 and is connected in parallel with the pixel electrode 69.

Each thin film transistor T includes a gate electrode 31 extending from the gate line 33, an active layer 39 formed of silicon, a source electrode 49 extending from the data line 53, and a drain electrode 51 contacting the pixel electrode 69. Meanwhile, the storage capacitor $C_{ST}$ includes the portion of the gate line 33 as a first electrode, a capacitor electrode 57 as a second electrode, and an insulator (not illustrated) disposed therebetween. The capacitor electrode 57 is formed of the same material as the source and drain electrodes 49 and 51 and communicates with the pixel electrode 69 through a storage contact hole 63.

In the related art illustrated in FIG. 1, the gate electrode 31 and the gate line 33 are generally formed of aluminum or aluminum alloy in order to prevent signal delay. Furthermore, all of the source electrodes 49, the drain electrodes 51, the data lines 53 and the data pad electrodes 55 can also be formed of aluminum or aluminum alloy. Alternatively, such electrodes and data line may be formed of aluminum-included double layers that can be formed of an aluminum (or aluminum-alloy) layer and an additional metal layer because the aluminum and aluminum alloy are chemically weak at etchant and developer during the process.

Now with reference to FIGS. 2A-2F, 3A-3F and 4A-4F, the fabrication process steps for forming an array substrate will be explained in detail according to the related art. FIGS. 2A-2F are cross-sectional views along II-II' of FIG. 1 illustrating exemplary fabrication process steps of a thin film transistor and a pixel electrode according to the related art, FIGS. 3A-3F are cross sectional views along III-III' of FIG. 1 illustrating exemplary fabrication process steps of a gate pad according to the related art, and FIGS. 4A-4F are cross sectional views along IV-IV' of FIG. 1 illustrating exemplary fabrication process steps of a data pad according to the related art.

In FIGS. 2A, 3A, and 4A, a first metal layer may be deposited onto a surface of a substrate 21, and then patterned to form a gate line 33, a gate electrode 31, and a gate pad electrode 35 on the substrate 21. As mentioned before, the gate pad electrode 35 may be disposed at the end of the gate line 33, and the gate electrode 31 may extend from the gate line 33. The first metal layer may be aluminum-based material(s), for example, aluminum (Al) or aluminum neodymium (AlNd), having low electrical resistance in order to prevent signal delay. Although the aluminum-based material, aluminum (Al) or aluminum neodymium (AlNd), has the low electrical resistance, it is chemically weak against the developer and etchant. Namely, the aluminum in the gate line 33 reduces the RC delay because it has a low resistance. However, aluminum is sensitive to acidity and susceptible to developing hillocks during a high temperature manufacturing or patterning process, possibly resulting in line defects.

Now in FIGS. 2B, 3B and 4B, a gate insulation layer 37 (or a first insulating layer) may be formed over the substrate 21 after the formation of the gate electrode 31, the gate line 33 and the gate pad electrode 35. The gate insulation layer 37 fully covers the gate electrode 31, the gate line 33 and the gate pad electrode 35. The gate insulation layer 37 may include inorganic material(s), for example, silicon nitride ($SiN_x$) and silicon oxide ($SiO_2$). Then, an intrinsic amorphous silicon layer (e.g., a-Si:H) and a doped amorphous silicon layer (e.g., $n^+$a-Si:H) may be sequentially deposited along an entire surface of the gate insulation layer 37, and may be simultaneously patterned using a mask process to form an active layer 39 and an ohmic contact layer 41. The ohmic contact layer 41 may be located on the active layer 39 over the gate electrode 31.

Next in FIGS. 2C, 3C and 4C, second to fourth metal layers 43, 45 and 47 are sequentially formed on the gate insulation layer 37 to cover both the active layer 39 and the ohmic contact layer 41. Here, the second and fourth metal layers 43 and 47 are molybdenum (Mo), and the third metal layer 45 interposed therebetween is aluminum (Al). Therefore, the triple-layered structure of Mo/Al/Mo is disposed on the gate insulation layer 37.

Thereafter, the second to fourth metal layers 43, 45 and 47 are simultaneously patterned as illustrated in FIGS. 2D, 3D and 4D. Thus, a source electrode 49, a drain electrode 51, a data line 53, a data pad electrode 55 and a capacitor electrode 57, all of which have the triple-layered structure, are formed over the substrate 21. The source electrode 49 extends from the data line 53 and contacts one portion of the ohmic contact layer 41. The drain electrode 51 is spaced apart from the source electrode 49 across the gate electrode 31 and contacts the other portion of the ohmic contact layer 41. As mentioned with reference to FIG. 1, the data pad electrode 55 is at the end of the data line 53, and the capacitor electrode 57 is shaped like an island and disposed above the gate line 33. After forming the source and drain electrodes 49 and 51, a portion of the ohmic contact layer 41 located between the source and drain electrodes 49 and 51 is removed to form a channel region. When forming the channel region, the source and drain electrodes 49 and 51 act as masks.

Meanwhile, the source and drain electrodes 49 and 51 and the data line 53 can be formed of a single layer of molybdenum or chromium. However, doing so may result in signal delay in those electrodes and data line such that it is hard to obtain uniform image quality all over the liquid crystal panel. Especially, if the liquid crystal panel becomes larger in size, the signal delay becomes more and more serious and difficult to overcome.

In contrast, when the source and drain electrodes 49 and 51 and the data line 53 include a metal having a low resistance, such as aluminum, the electrical signals flow without the signal delay such that the array substrate can be fabricated in a large size. Therefore, the source and drain electrodes 49 and 51 and the data lines 53 herein include the aluminum layer therein. Further, when aluminum is used for the source and drain electrodes 49 and 51, the molybdenum layers are formed on both upper and lower surfaces of the aluminum layer. The second metal of molybdenum formed underneath the aluminum layer acts to prevent a spiking phenomenon that may occur in circumstances where the aluminum layer penetrates into the active layer 39 or the ohmic contact layer 41. The fourth metal of molybdenum formed on the aluminum layer acts to reduce contact resistance between the aluminum layer and a later-formed transparent electrode. For these reasons, the source and drain electrodes 49 and 51 and the data line 53 are formed to have the triple-layered structure of Mo/Al/Mo.

Now in FIGS. 2E, 3E and 4E, a passivation layer 59, which is a second insulating material, is formed all over the substrate 21 to cover the source and drain electrodes 49 and 51, the data line 53, the data pad electrode 55 and the storage capacitor 57. Thereafter, the passivation layer 59 is patterned to form a drain contact hole 61, a storage contact hole 63 a gate pad contact hole 65, and a data pad contact hole 67. The drain contact hole 61 exposes a portion of the triple-layered drain electrode 51, the storage contact hole 63 exposes a portion of the triple-layered capacitor electrode 57, the gate pad contact hole 65 exposes a portion of the triple-layered gate pad electrode 35, and the data pad contact hole 67 exposes a portion of the triple-layered data pad electrode 55.

In FIGS. 2F, 3F and 4F, a transparent conductive material is deposited on the passivation layer 59 having the above-mentioned holes, and then this transparent conductive material is patterned to form a pixel electrode 69, a gate pad terminal 71 and a data pad terminal 73. The transparent conductive material is one of indium tin oxide (ITO) and indium zinc oxide (IZO). The pixel electrode 69 contacts the drain electrode 51 and the capacitor electrode 57, respectively, through the drain contact hole 61 and storage contact hole 63. Further, the gate pad terminal 71 contacts the gate pad electrode 35 through the gate pad contact hole 65, and the data pad terminal 73 contacts the datapad electrode 55 through the data pad contact hole 67. Accordingly, the array substrate of the related art is complete.

In the related art illustrated in FIGS. 2A-2F, 3A-3F and 4A-4F, the source and drain electrodes 49 and 51, the data line 53 and the data pad electrode 55, all of which have the triple-layered structure, are formed by an etching solution that simultaneously etches aluminum and molybdenum. Thus, an electrochemical reaction, such as a Galvanic Reaction, will be generated by the etching solution during this etching process. As the molybdenum layer becomes thicker, it becomes more difficult to overcome the problem of electrochemical reaction. During the etching process of patterning the second to fourth metal layers, the molybdenum layers disposed on the upper and lower surfaces of the aluminum layer are over-etched. Especially, when the second layer of molybdenum underlying the third layer of aluminum is overly etched and when the passivation layer is formed over them, the third aluminum layer collapses and contacts the active layer in the thin film transistor. The connection between the aluminum layer and the active layer will increase the leakage current and deteriorate the operating characteristics of the thin film transistor.

FIG. 5 is an enlarged cross-sectional view of a portion A of FIG. 2F and illustrates an over-etching in the second and fourth metal layers of the drain electrode. As illustrated in a portion E of FIG. 5, the molybdenum layers 43 and 47 are overly etched relative to the aluminum layer 45. This phenomenon of over-etching also occurs in the source electrode 51, the data line 53 and the data pad electrode 55. The over-etching of the molybdenum layers 43 and 47 causes the passivation layer 59 to be formed improperly over the substrate 21. Furthermore, the over-etching of the molybdenum layer 43 causes the aluminum layer 45 to contact the active layer 39 and/or the ohmic contact layer 41 because the aluminum layer 45 is pressed by the passivation layer 59, thereby increasing the leakage current in the thin film transistor. The increase of the OFF current deteriorates the electrical characteristics of the thin film transistor.

SUMMARY OF THE INVENTION

Accordingly, the present invention is directed to an array substrate for a liquid crystal display (LCD) device that substantially obviates one or more of problems due to limitations and disadvantages of the related art.

An advantage of the present invention is to provide an array substrate for use in a liquid crystal display device, which has a reduced leakage current in thin film transistors.

Another advantage of the present invention is to provide a method of forming an array substrate for use in a liquid crystal display device, which simplifies and stabilizes the manufacturing process and increases the manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for use in a liquid crystal display device includes a gate electrode, a gate line and a gate pad electrode on a substrate, wherein all of the gate electrode, the gate line and the gate pad electrode have a first barrier metal layer, a first copper layer, and a first out-diffusion film that covers and surrounds the first copper layer; a gate insulation layer on the substrate covering the gate electrode, gate line and gate pad; an active layer and an ohmic contact layer sequentially formed on the gate insulation layer and over the gate electrode; a data line on the gate insulation layer perpendicularly crossing the gate line, source and drain electrodes contacting the ohmic contact layer, and a data pad electrode on the gate insulation layer; a passivation layer formed on the gate insulation layer to cover the data line, source and drain electrodes, and data pad electrode, wherein the passivation layer has a drain contact hole exposing a portion of the drain electrode, a gate pad contact hole exposing a portion of the gate pad electrode, and a data pad contact hole exposing a portion of the data pad electrode; and a pixel electrode, a gate pad terminal and a data pad terminal all of which are formed of a transparent conductive material on the passivation layer.

In another aspect, a method of forming an array substrate for use in a liquid crystal display device includes: forming a gate electrode, a gate line and a gate pad electrode on a substrate, wherein all of the gate electrode, the gate line and the gate pad electrode have a double-layered structure including a first barrier metal layer and a first copper layer; applying heat to the double-layered gate electrode, line and pad electrode so as to form a first out-diffusion film covering and surrounding the first copper layer; forming a gate insulation layer on the substrate to cover the gate electrode, gate line and gate pad electrode which include the first barrier metal layer, the first copper layer and the first out-diffusion film; forming an active layer and an ohmic contact layer sequentially on the gate insulation layer and over the gate electrode; forming a data line, source and drain electrodes and a data pad electrode, wherein the data line is on the gate insulation layer and crossed the gate line, wherein the source and drain electrodes contact the ohmic contact layer, wherein the data pad electrode is disposed on the gate insulation layer, and wherein all of the data line, the source and drain electrodes, the capacitor electrode and the data pad electrode have a double-layered structure including a second barrier metal layer and a second copper layer; applying heat to the double-layered data line, source and drain electrodes and data pad electrode so as to form a second out-diffusion film that covers and surrounds the second copper layer; forming a passivation layer formed on the gate insulation layer to cover the double-layered data line, source and drain electrodes, and data pad electrode all of which have the second barrier metal layer, the second copper layer and the second out-diffusion film, wherein the passivation layer has a drain contact hole exposing the drain electrode, a gate pad contact hole exposing the gate pad electrode, and a data pad contact hole exposing the data pad electrode; and forming a pixel electrode, a gate pad terminal and a data pad terminal on the passivation layer using a transparent conductive material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 8A to 9F are cross sectional views illustrating a process of forming a data pad according to the present invention.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

FIGS. 6A to 6F are cross sectional views illustrating a process of forming a pixel according to the present invention.

FIGS. 7A to 7F are cross sectional views illustrating a process of forming a gate pad according to the present invention. FIGS. 8A to 8F are cross sectional views illustrating a process of forming a data pad according to the present invention.

In the present invention, the gate, source and drain electrodes are distinguishable in that they are double layers including a copper layer. Furthermore, the plan view of the present invention is similar to that of FIG. 1, so a separate plan view is not included.

Figure 6A:
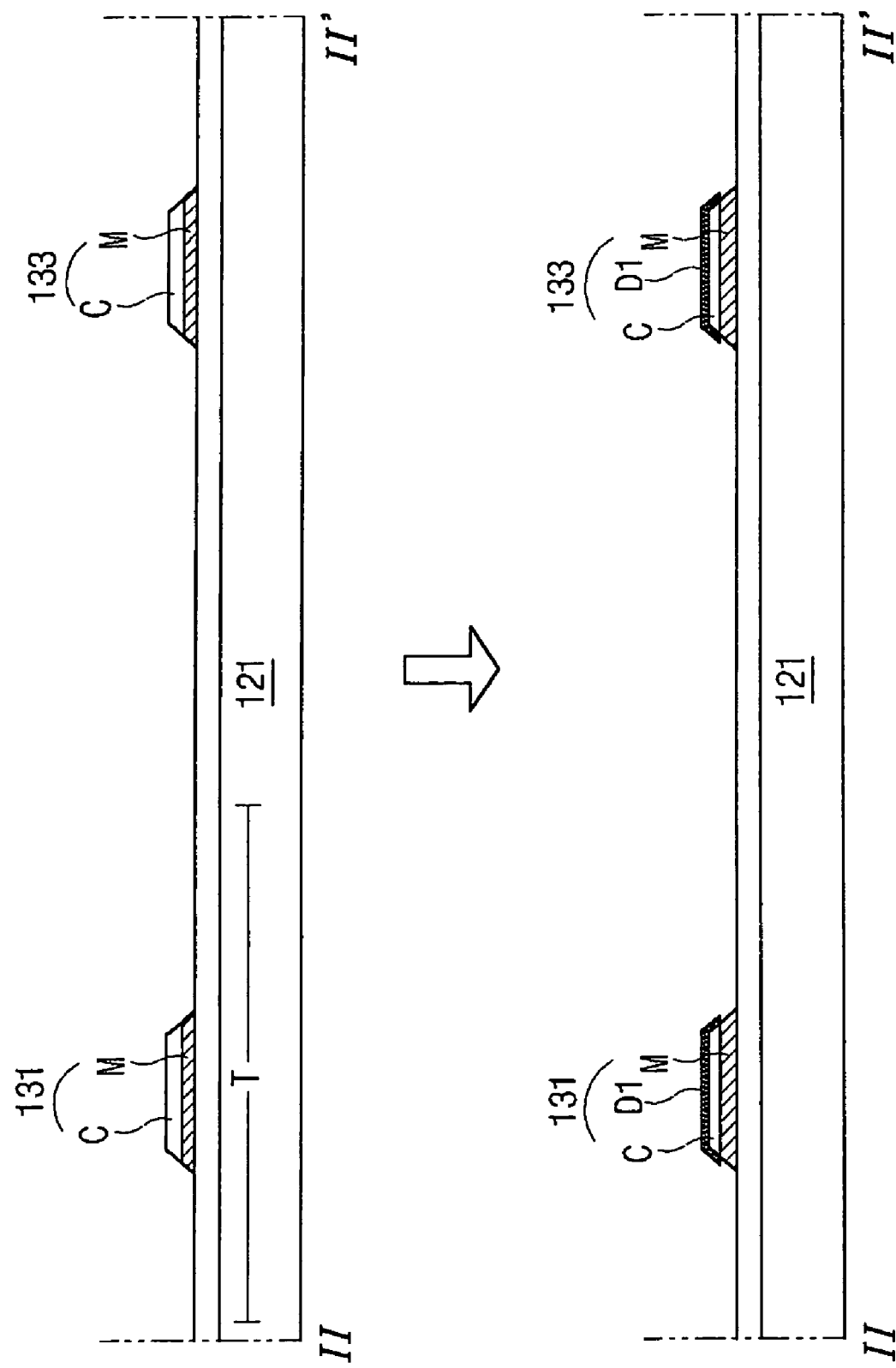
FIGS. 6A to 6F are cross sectional views illustrating a process of forming a pixel according to the present invention
Figure 7A:
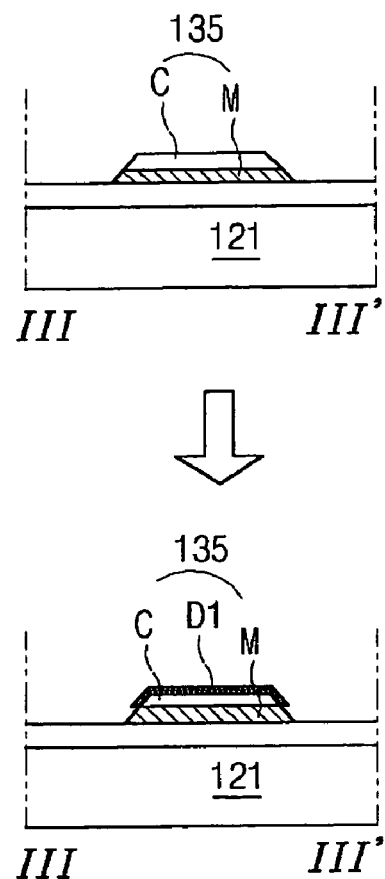
FIGS. 7A to 7F are cross sectional views illustrating a process of forming a gate pad according to the present invention
Figure 8A:
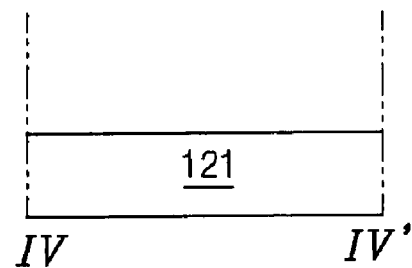
Figure 8A:
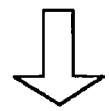
Figure 8A:
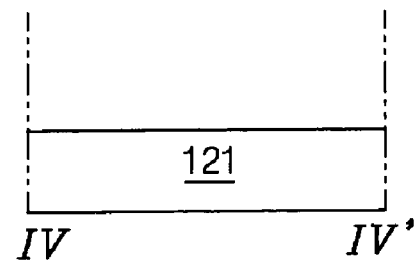

Referring to FIGS. 6A, 7A and 8A, a first metal layer M and a second metal layer C are sequentially formed on a substrate 121, and then the first and second metal layer M and C are simultaneously patterned to form a gate electrode 131, a gate line 133, and a gate pad electrode 135. The first metal layer M may be molybdenum (Mo) or molybdenum alloy (Mo-alloy, and the second metal layer C may be copper (Cu). When the first metal layer M is the Mo-alloy layer, it may include molybdenum and at least one of titanium (Ti), tantalum (Ta), chromium (Cr), nickel (Ni), neodymium (Nd), indium (In), aluminum (Al), or an alloy of thereof. The first metal layer M acts as a barrier metal that holds the second metal layer C that will be attached to the substrate 121. Because the copper layer C does not adhere well to the substrate 121, the barrier metal M is interposed between the substrate 121 and the copper layer C.

Figure 1:
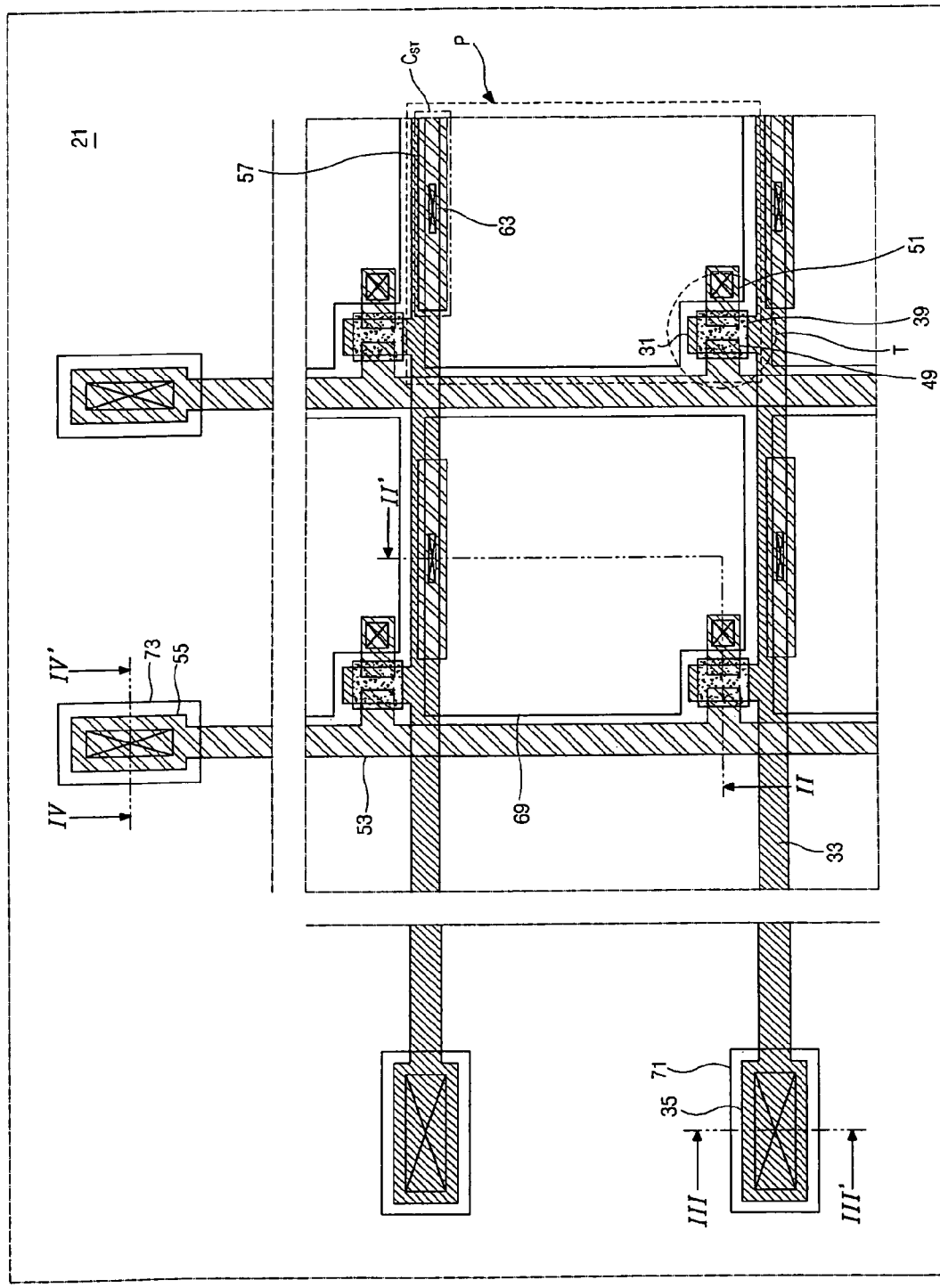
FIG. 1 is a partially enlarged plan view of an exemplary array substrate according to a related art.
Figure 2A:
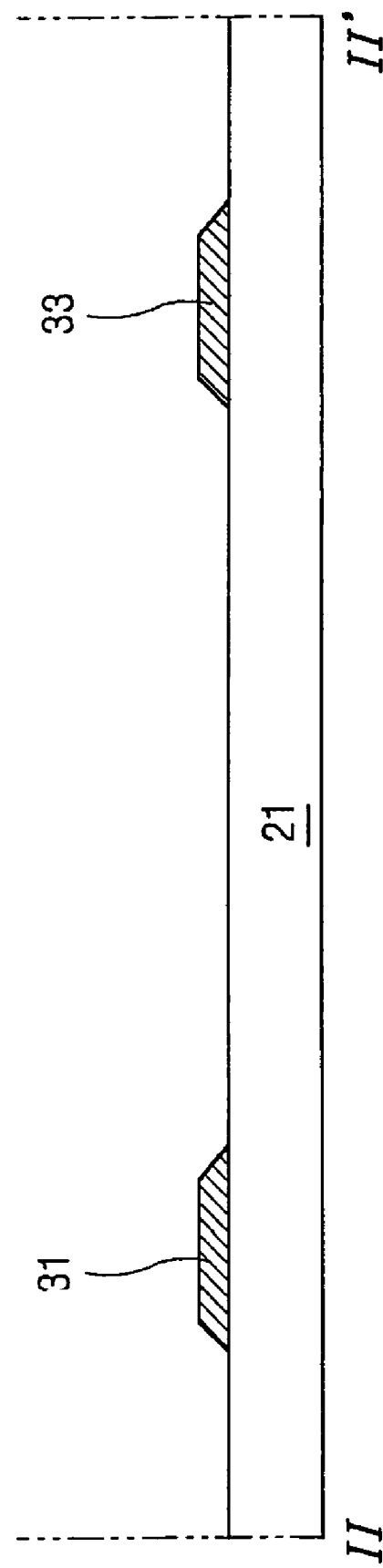
FIGS. 2A-2F are cross-sectional views along II-II' of FIG. 1 illustrating exemplary fabrication process steps of a thin film transistor and a pixel electrode according to the related art.
Figure 2B:
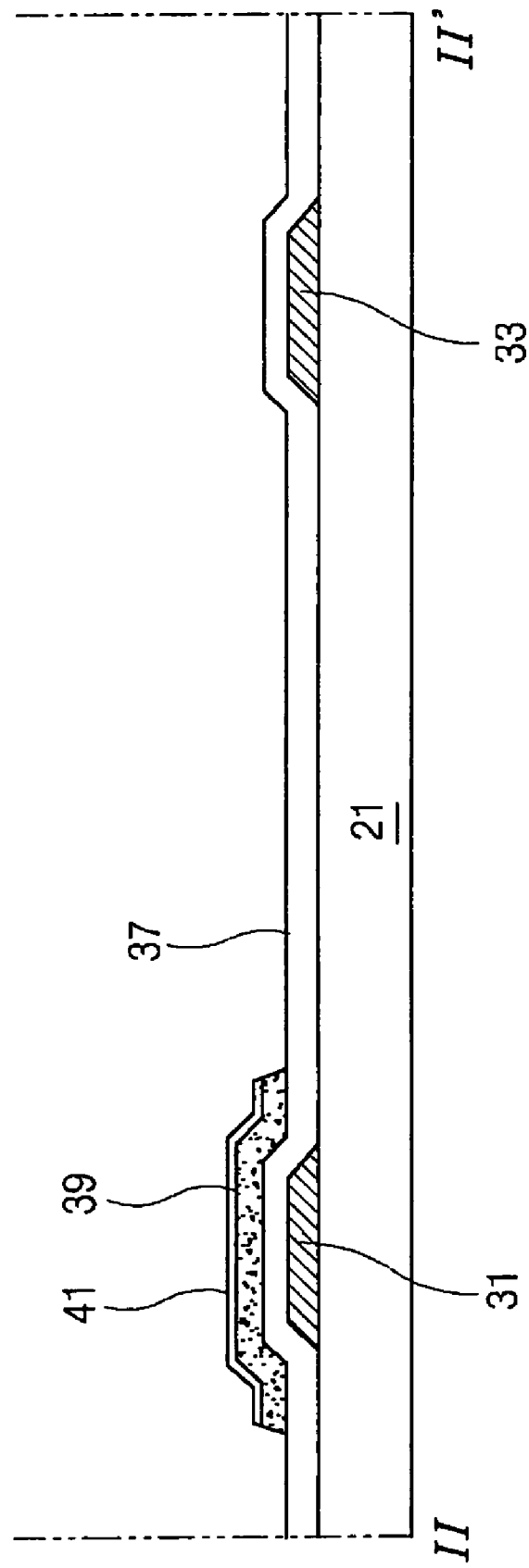
Figure 2C:
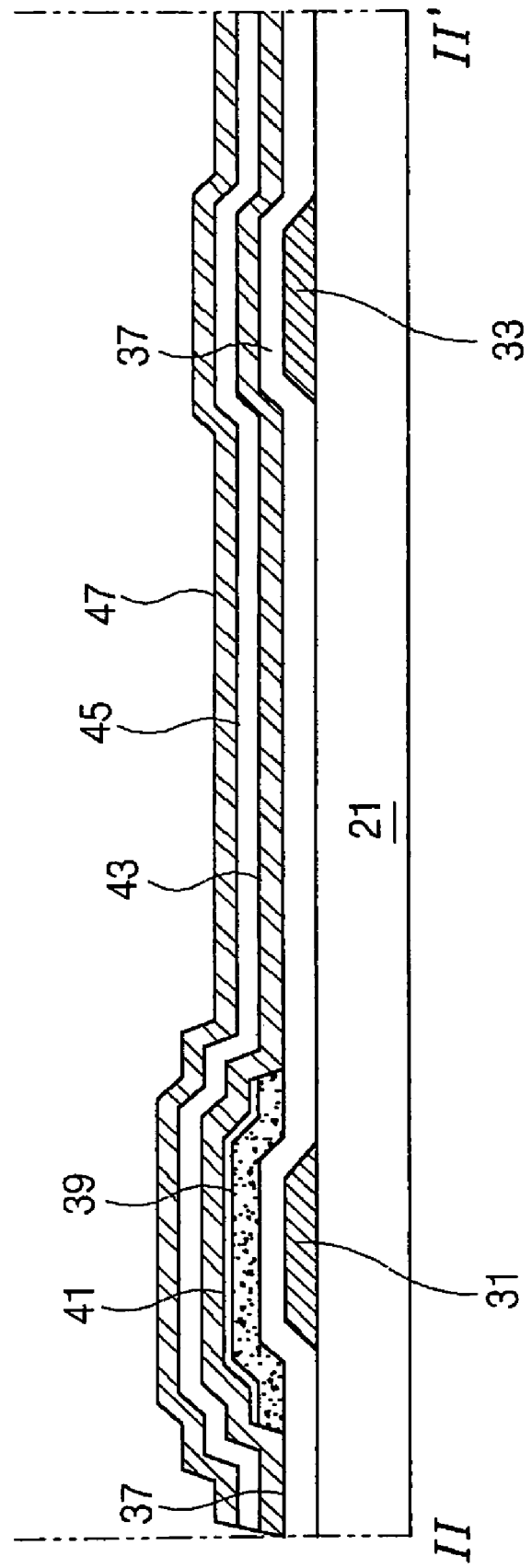
Figure 2D:
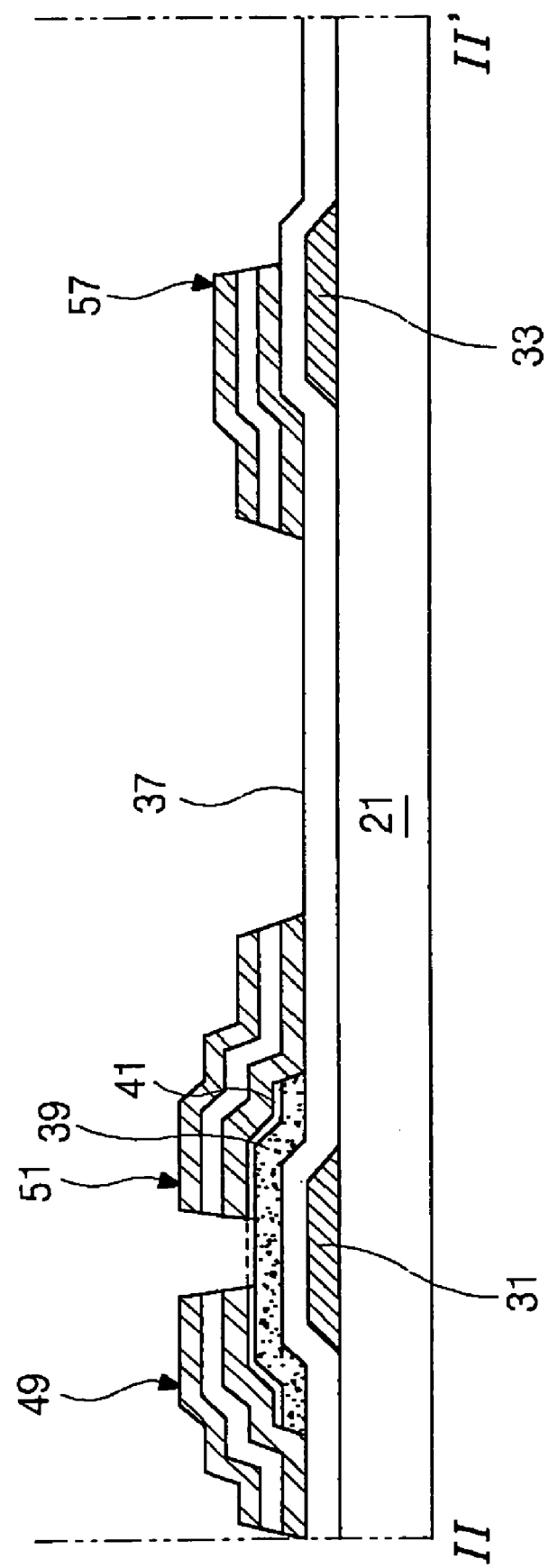
Figure 2E:
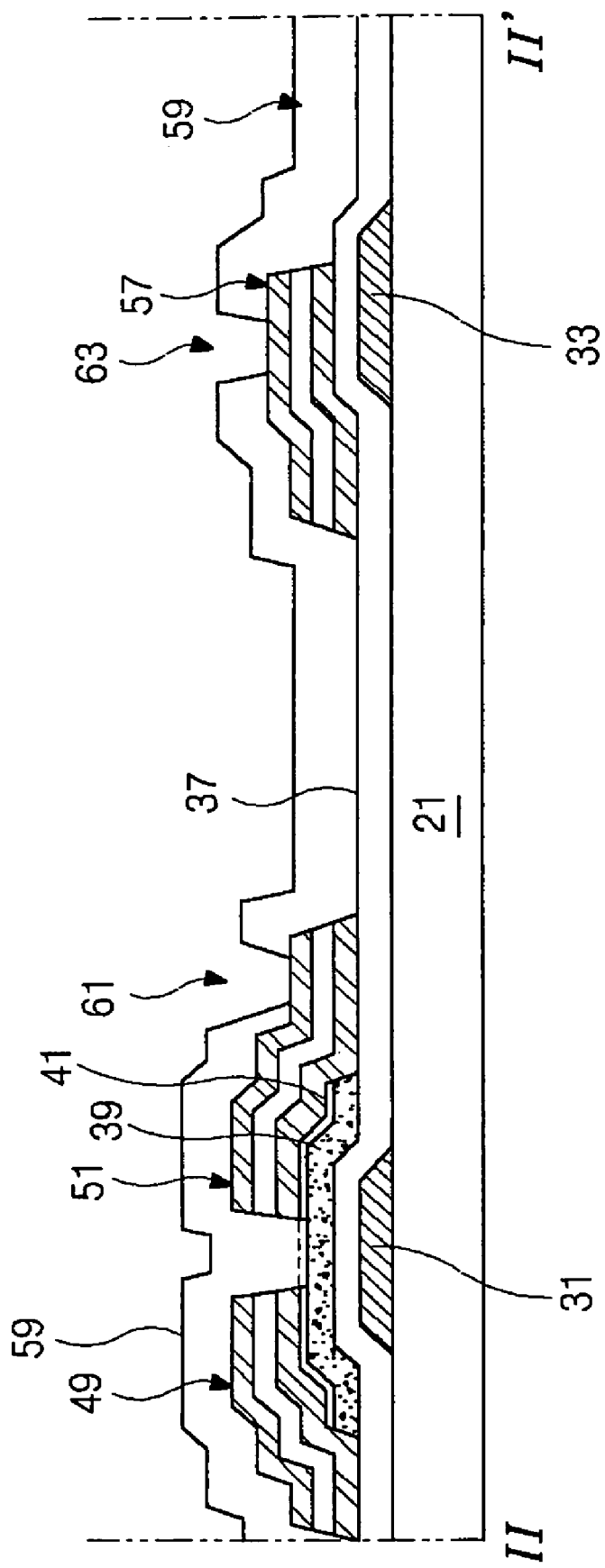
Figure 2F:
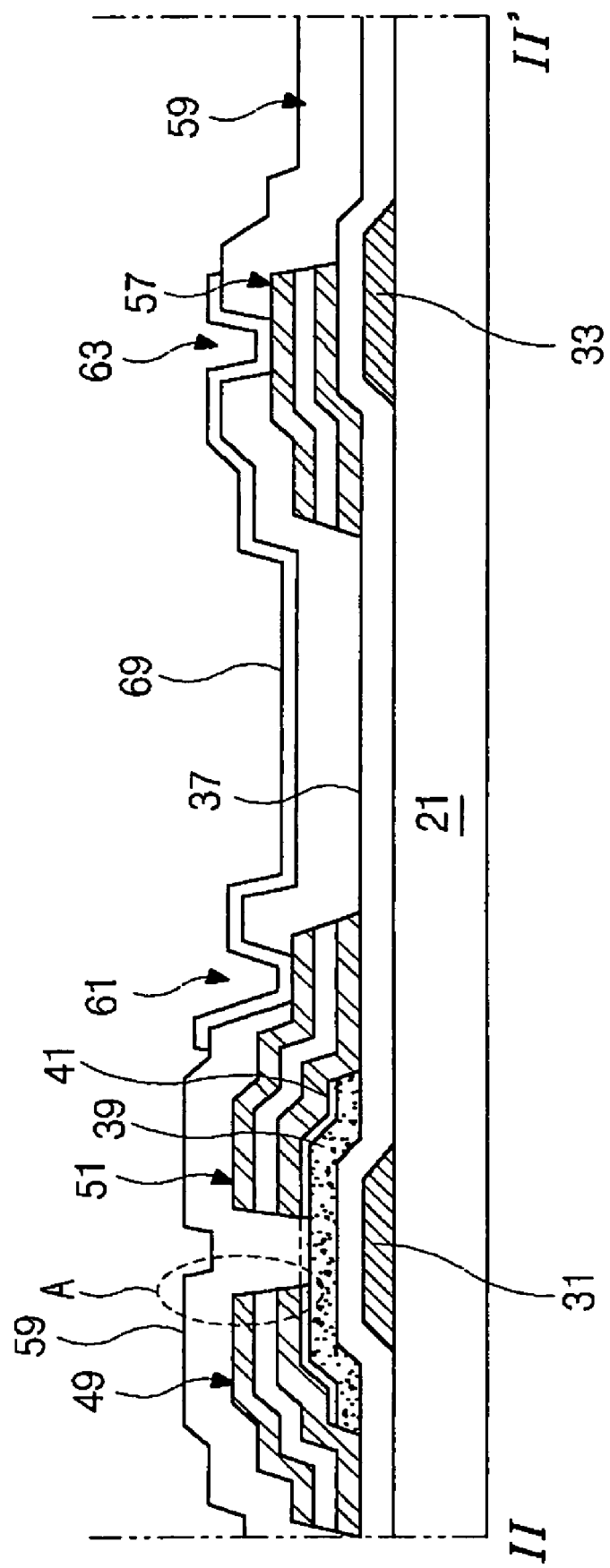
Figure 3A:
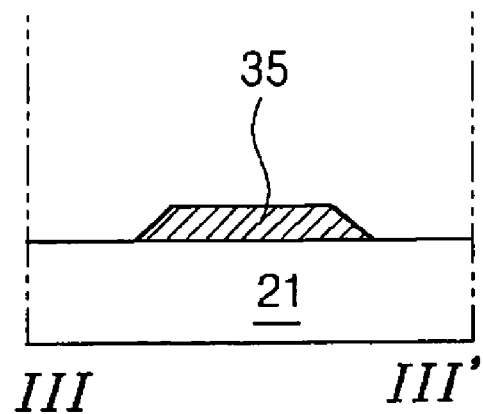
FIGS. 3A-3F are cross sectional views along III-III' of FIG. 1 illustrating exemplary fabrication process steps of a gate pad according to the related art.
Figure 3B:
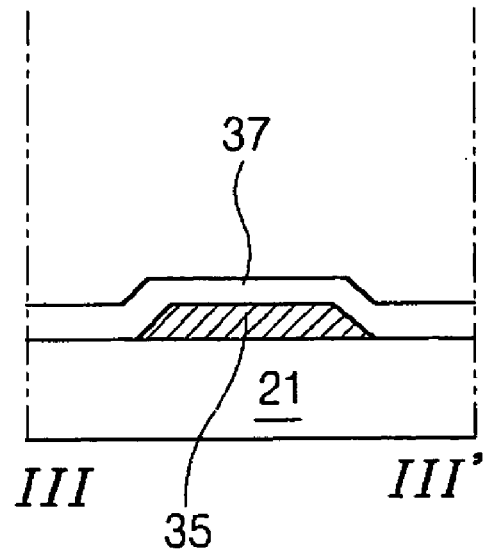
Figure 3C:
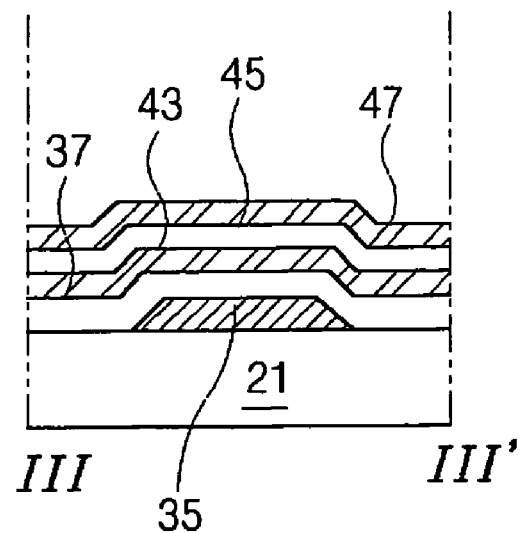
Figure 3D:
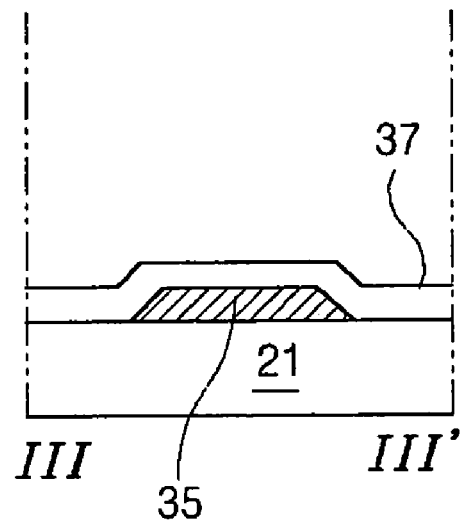
Figure 3E:
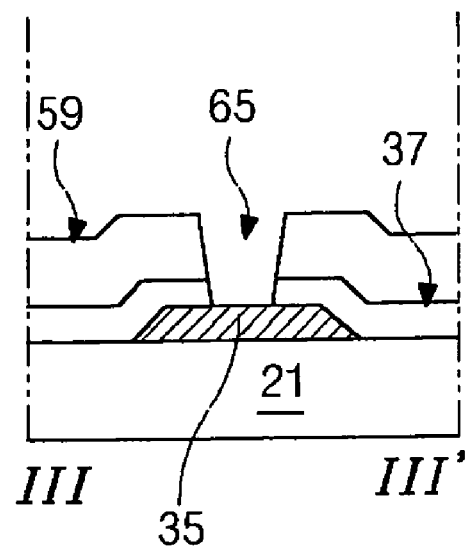
Figure 3F:
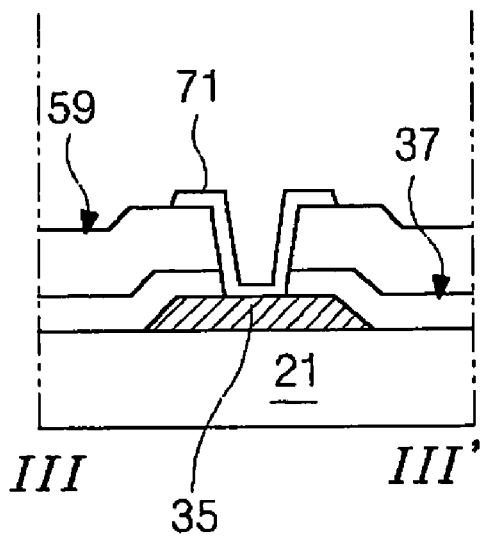
Figure 4A:
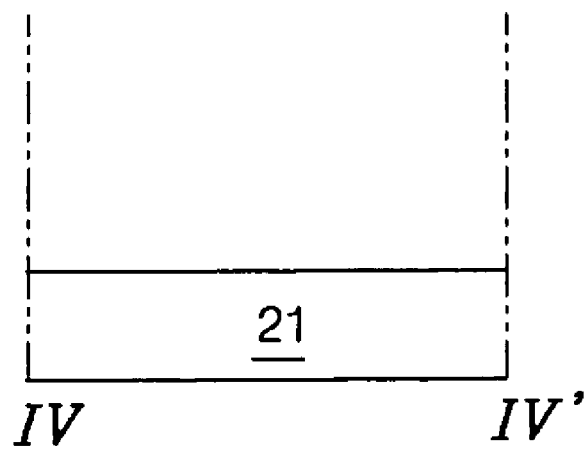
FIGS. 4A-4F are cross sectional views along IV-IV' of FIG. 1 illustrating exemplary fabrication process steps of a data pad according to the related art.
Figure 4B:
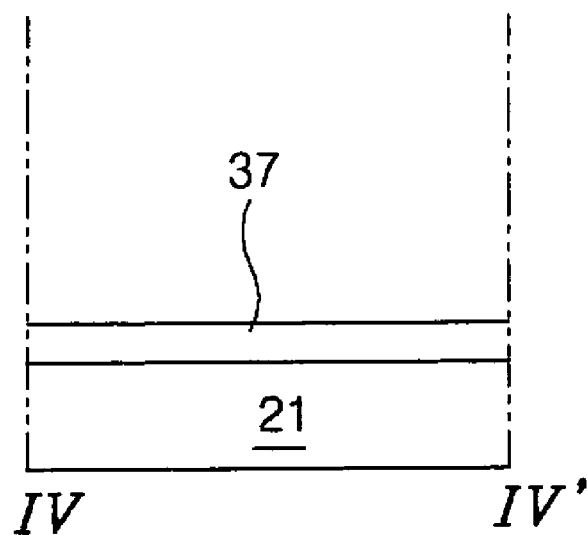
Figure 4C:
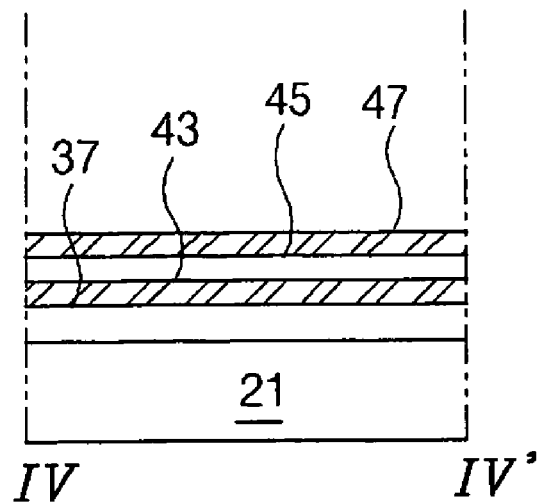
Figure 4D:
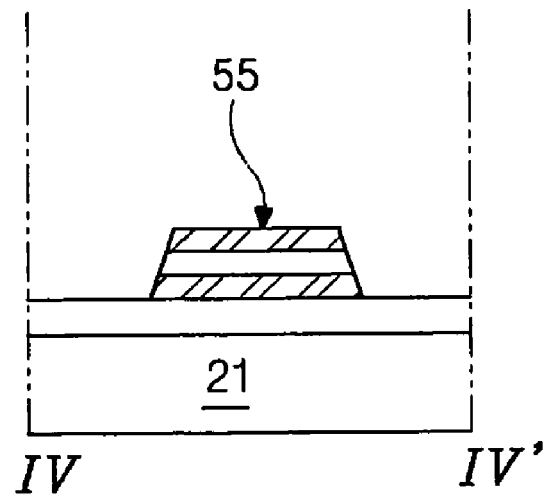
Figure 4E:
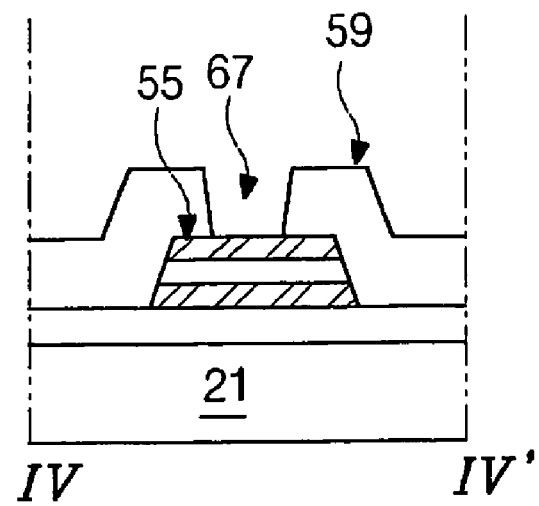
Figure 4F:
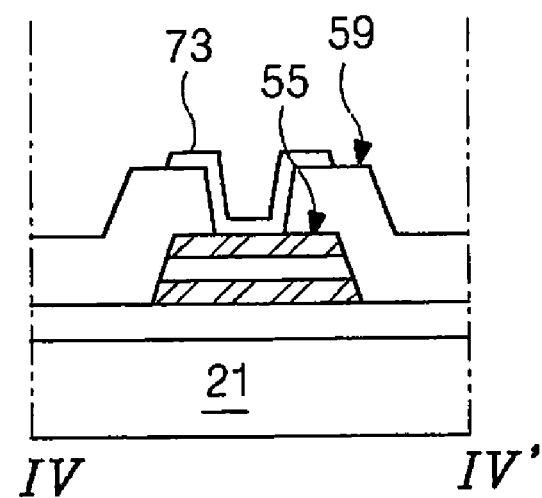
Figure 5:
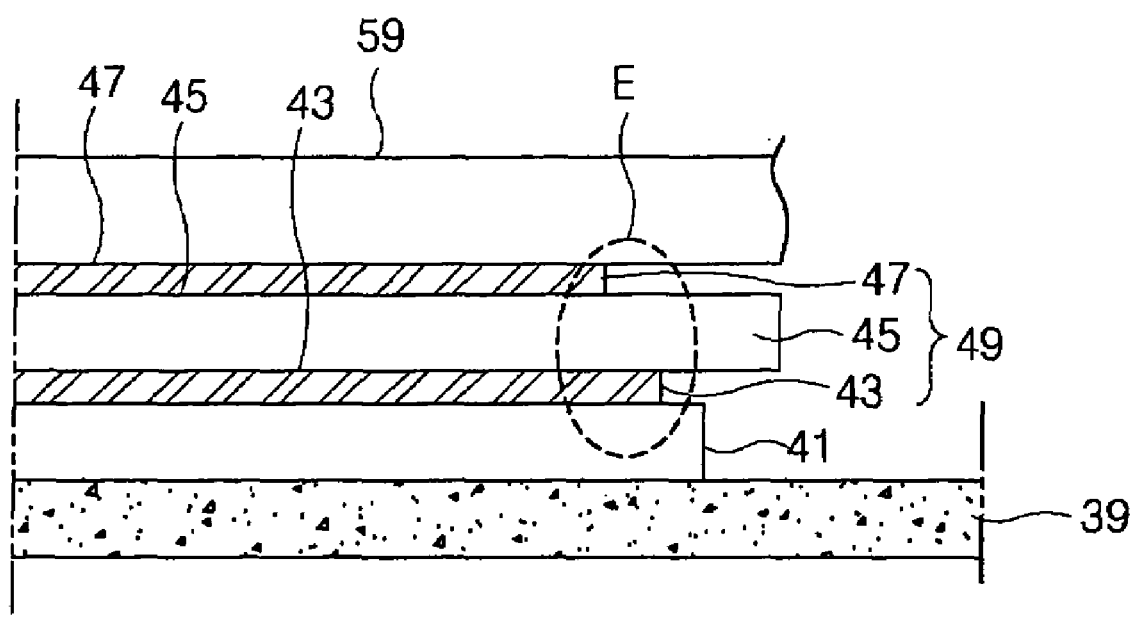
FIG. 5 is an enlarged cross-sectional view of a portion A of FIG. 2F and illustrates an over-etching in the second and fourth metal layers of the drain electrode.

Although not illustrated in FIGS. 6A, 7A and 8A, but illustrated in FIG. 1, the gate line 133 is disposed in a first direction on the substrate 121, and the gate electrode 131 extends from the gate line 133. The gate pad electrode 135 is disposed at an end of the gate line 133. In the exemplary of the present invention, all of the gate electrode 131, line 133 and pad electrode 135 has a double-layered structure including the first layer M of molybdenum and the second layer C of copper.

Still referring to FIGS. 6A, 7A and 8A, after forming the double-layered gate electrode 131, line 133 and pad electrode 135, the substrate 121, including lines and electrodes, are heat-treated at a temperature of about 200 degrees Celsius. Therefore, a first out-diffusion film D1 is formed on the second layer C of copper. The first out-diffusion film D1 has a thickness of about 1 to 100 angstroms. During the heat treatment, the molybdenum included in the first layer M diffuses along on the surface of the second layer C and then reacts with the copper included in the first layer C. As a result, the first out-diffusion film D1 becomes an metal alloy film of molybdenum and copper. As illustrated in FIGS. 6A and 7A, the first out-diffusion film D1 completely covers and surrounds the second layer C.

Figure 6B:
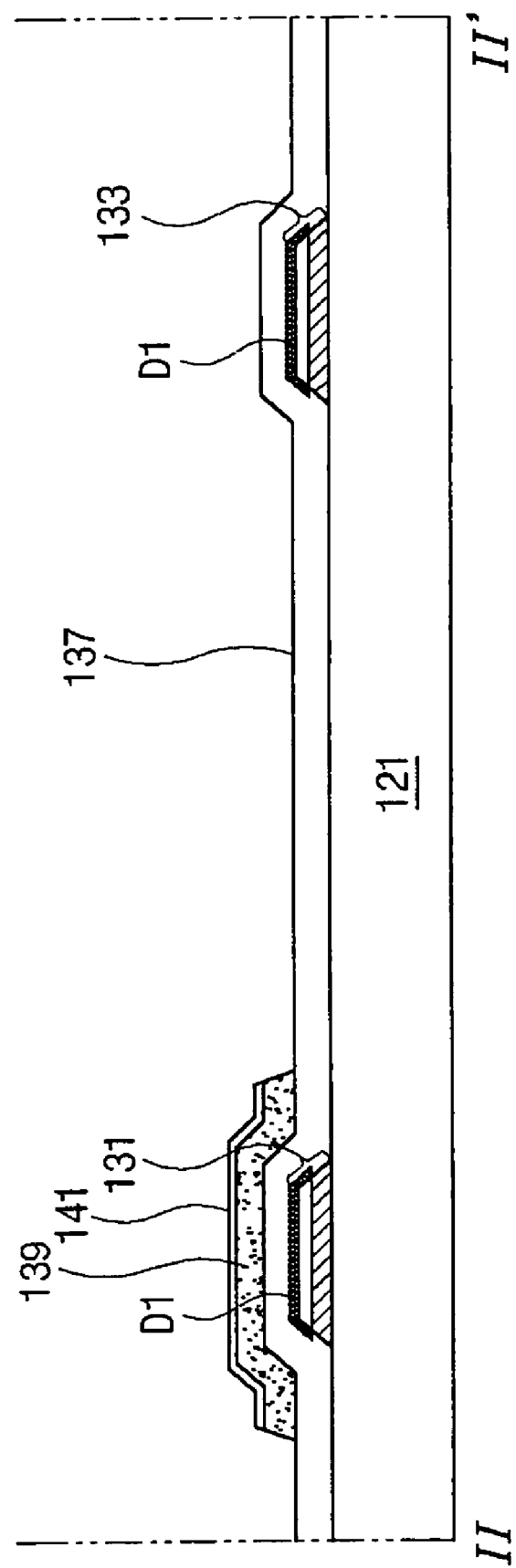
Figure 7B:
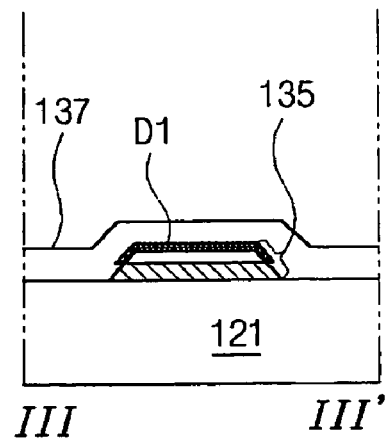
Figure 8B:
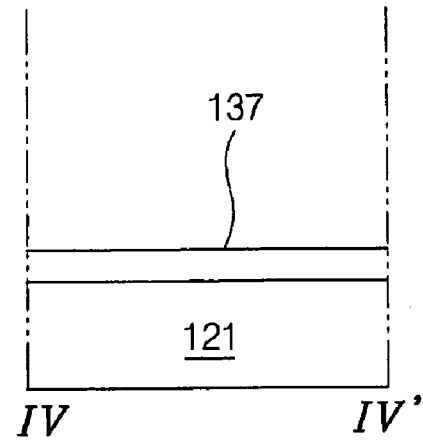

Now referring to FIGS. 6B, 7B and 8B, a gate insulation layer 137 (a first insulating layer) is formed on the substrate 121 to cover the double-layered gate electrode 131, line 133 and pad electrode 135, all of which include the first out-diffusion film D1. The gate insulation layer 137 is an inorganic material, for example, silicon nitride ($SiN_x$) or silicon oxide ($SiO_2$). Thereafter, amorphous silicon (a-Si:H) and $n^+$ doped amorphous silicon ($n^+$a-Si:H) are sequentially formed on the gate insulation layer 137 and then patterned to form an active layer 139 and an ohmic contact layer 141. The active layer 139 is disposed on the gate insulation layer 137, especially over the gate electrode 131, and the ohmic contact layer 141 is disposed on the active layer 139.

Figure 6C:
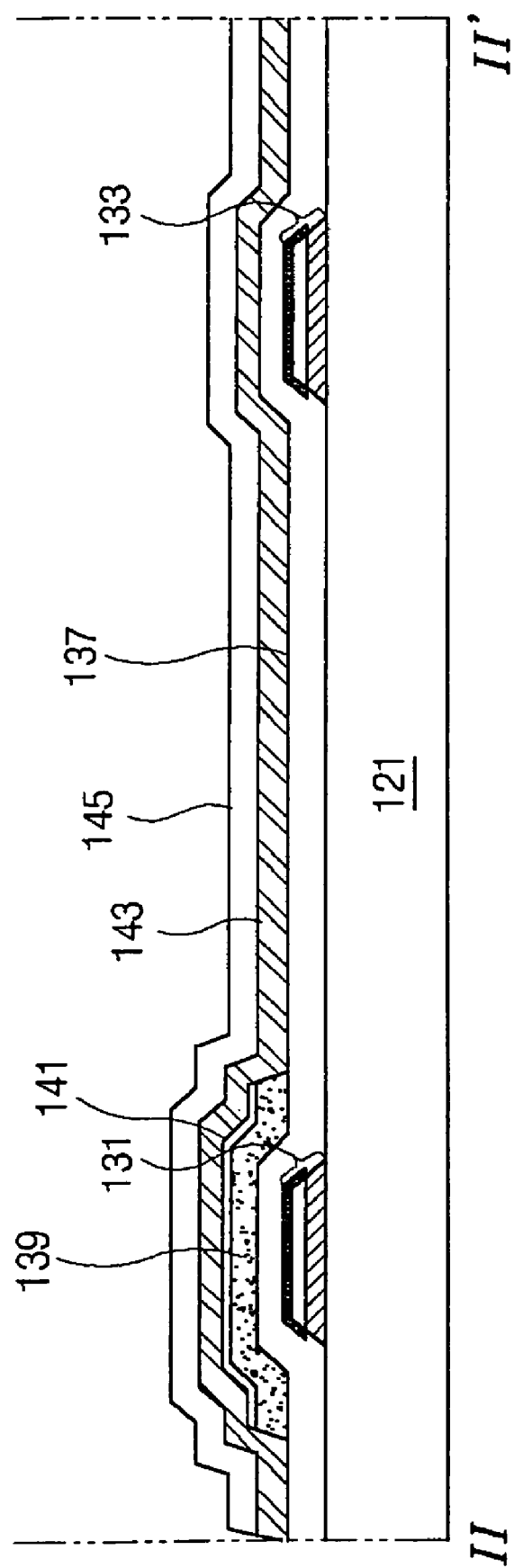
Figure 7C:
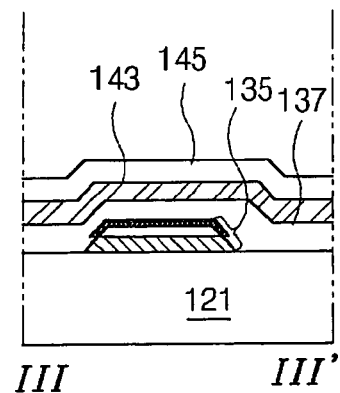
Figure 8C:
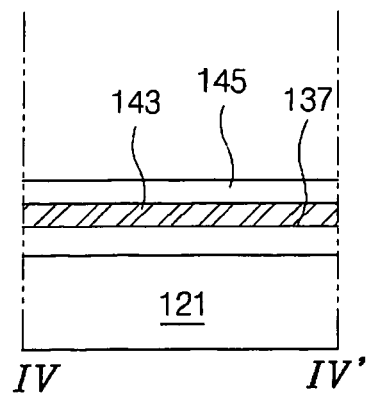

Next in FIGS. 6C, 7C and 8C, third and fourth metal layers 143 and 145 are sequentially formed on the gate insulation layer 137 to cover both the active layer 139 and the ohmic contact layer 141. Here, the third metal layer 143 may be molybdenum (Mo) or a molybdenum alloy. Further, the fourth metal layer 145 is copper (Cu). The third metal layer 143 acts as a barrier metal that is used to prevent the copper layer 145 from directly contacting the semiconductor layer of active layer 139 and of ohmic contact layer 141 because the copper layer 145 may react with silicon included in the active and ohmic contact layers 139 and 141. Therefore, the double-layered structure of the molybdenum (or molybdenum alloy) layer 143 and the copper layer 145 is disposed on the gate insulation layer 137.

Figure 6D:
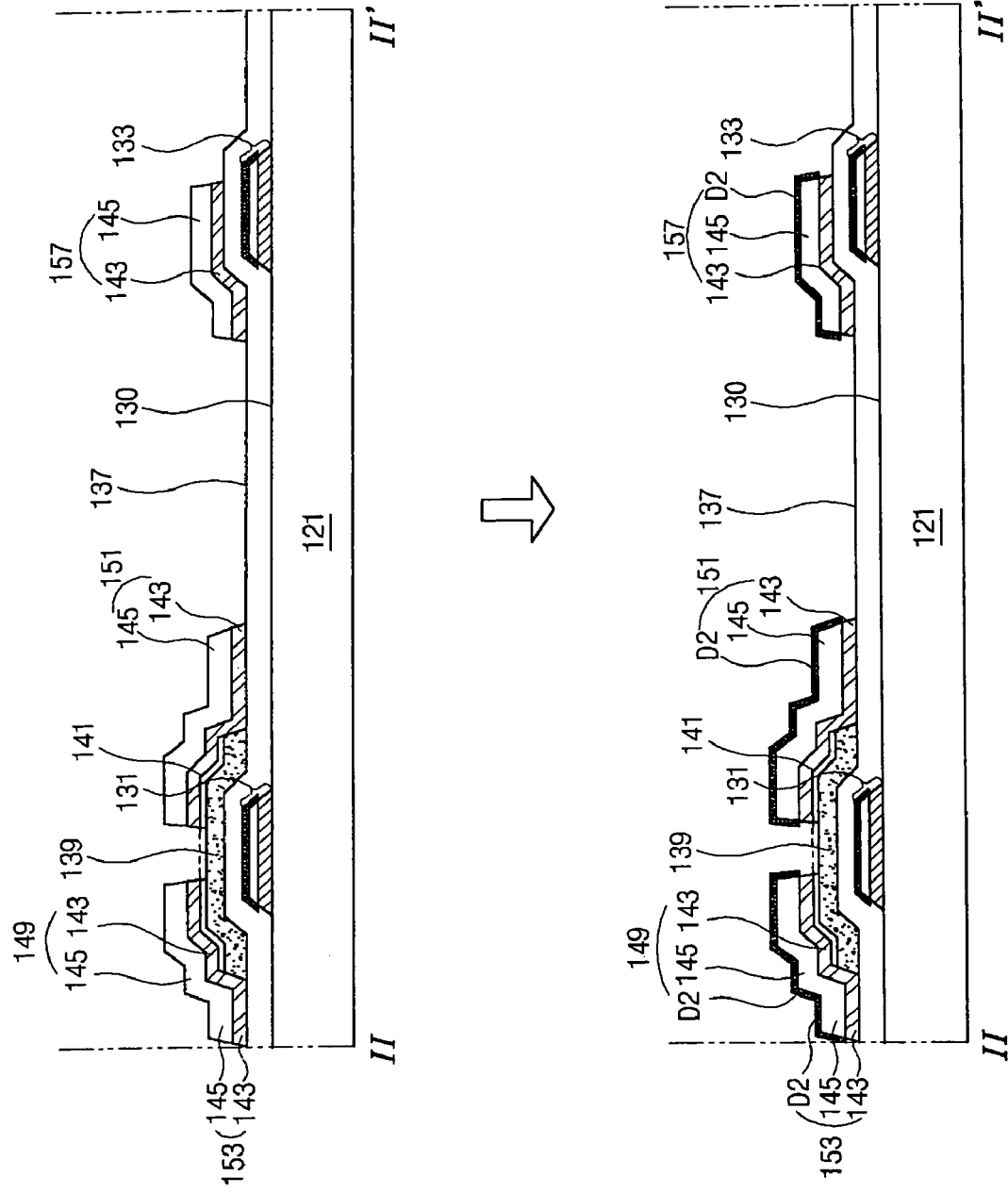
Figure 7D:
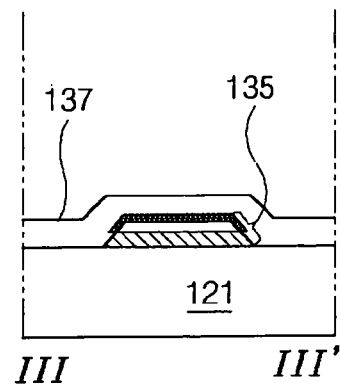
Figure 7D:
Figure 7D:
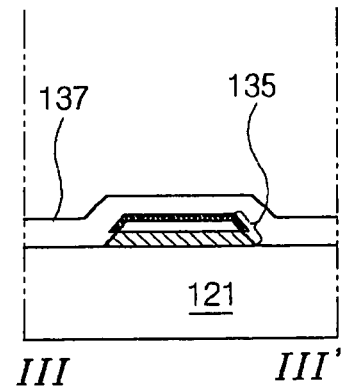
Figure 8D:
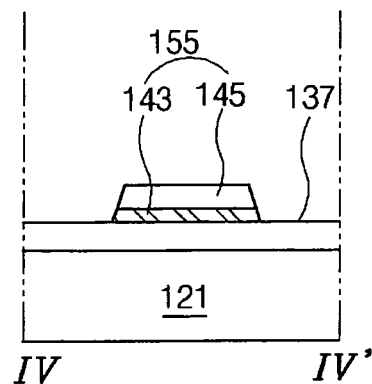
Figure 8D:
Figure 8D:
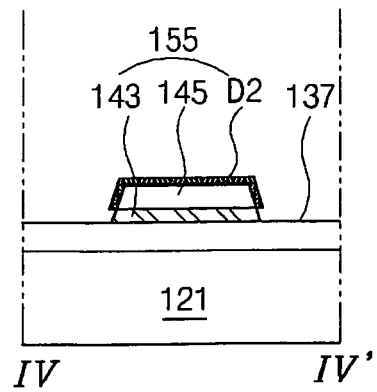

Thereafter, the third and fourth metal layers 143 and 145 are simultaneously patterned through an etch process. Thus, as illustrated in FIGS. 6D, 7D and 8D, a source electrode 149, a drain electrode 151, a data line 153, a data pad electrode 155 and a capacitor electrode 157, all of which have the double-layered structure, are formed over the substrate 121. Although not illustrated in FIGS. 6D, 7D and 8D, but illustrated in FIG. 1, the source electrode 149 extends from the data line 153 and contacts one portion of the ohmic contact layer 141. The drain electrode 151 is spaced apart from the source electrode 149 across the gate electrode 131, and contacts the other portion of the ohmic contact layer 141. As mentioned before, the data pad electrode 155 is at the end of the data line 153, and the capacitor electrode 157 is isolated, or shaped like an island and disposed above a portion of the gate line 133.

Still referring to FIGS. 6D, 7D and 8D, the substrate 121, which includes the double-layered source electrode 149, drain electrode 151, data line 153, data pad electrode 155 and capacitor electrode 157, is additionally heat-treated at a temperature of about 200 degrees Celsius, as like forming the first out-diffusion film D1. Therefore, a second out-diffusion film D2 having a thickness of about 1 to 100 angstroms is formed on the copper layer 145. During the heat treatment, the molybdenum included in the molybdenum (or molybdenum alloy) layer 143 diffuses along on the surface of the copper layer 145, and then reacts with the copper layer 145. As a result, the second out-diffusion film D1 becomes a metal alloy film of molybdenum and copper. As illustrated in FIGS. 6D and 8D, the second out-diffusion film D2 completely covers and surrounds the copper layer 145. The second out-diffusion film D2 enhances the adhesion of an insulator that is formed thereon in a later process step.

Although not expressly mentioned before, the third metal layer 143 may be pure molybdenum or molybdenum alloy that includes molybdenum and at least one of titanium (Ti), tantalum (Ta), chromium (Cr), nickel (Ni), neodymium (Nd), indium (In), aluminum (Al) layer, and an alloy of thereof.

Meanwhile, after or before the heat treatment, a portion of the ohmic contact layer 141 between the source and drain electrodes 149 and 151 is removed to form a channel region on the active layer 139 using the source and drain electrodes 149 and 151 as masks.

Figure 6E:
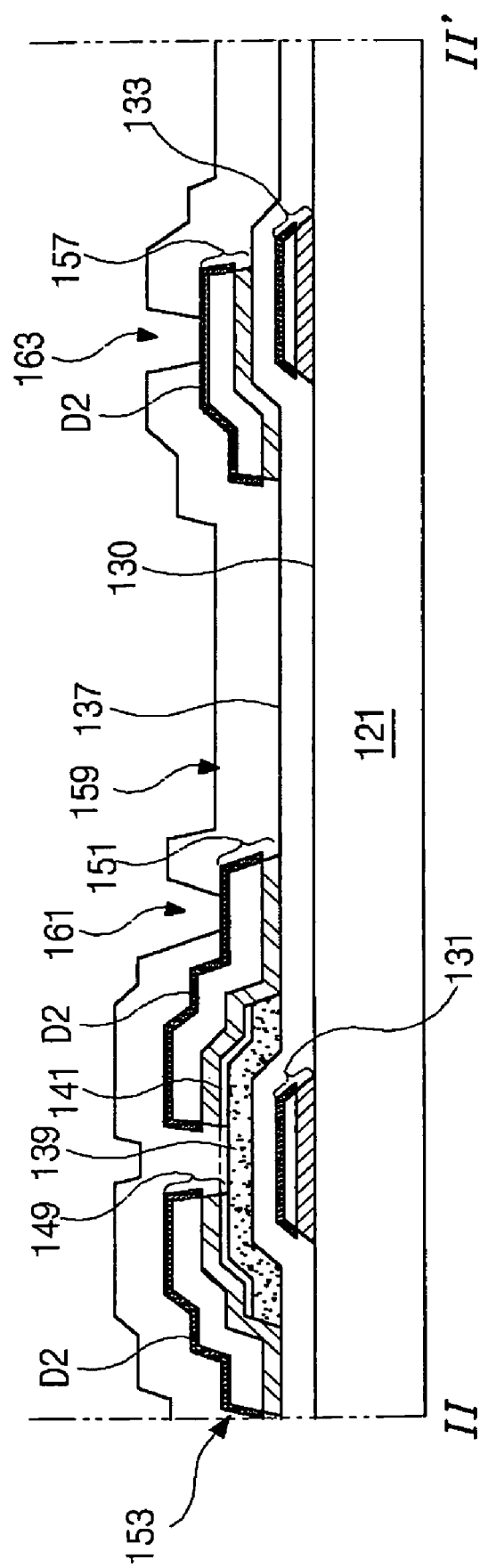
Figure 7E:
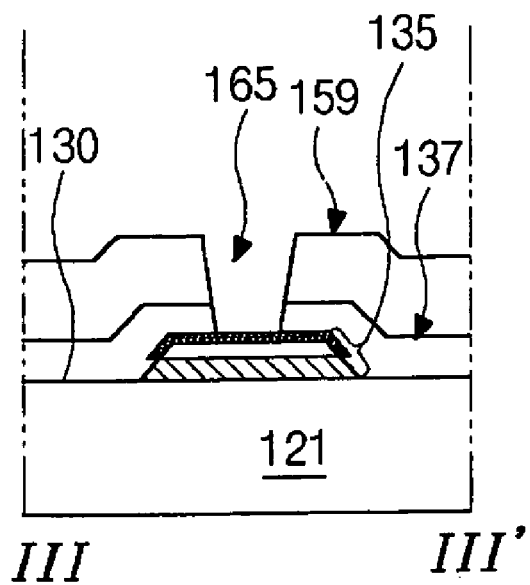
Figure 8E:
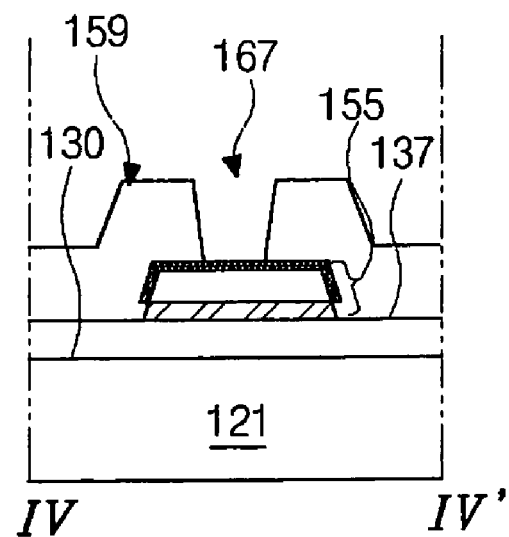

Now in FIGS. 6E, 7E and 8E, a passivation layer 159, which is a second insulating layer, is formed all over the substrate 121. The passivation layer 159 covers the source and drain electrodes 149 and 151, the data line 153, the data pad electrode 155 and the storage capacitor 157. By patterning the passivation layer 159, a drain contact hole 161, a storage contact hole 163, a gate pad contact hole 165, and a data pad contact hole 167 are formed. The drain contact hole 161 exposes a portion of the drain electrode 151, the storage contact hole 163 exposes a portion of the capacitor electrode 157, the gate pad contact hole 165 exposes a portion of the gate pad 135, and the data pad contact hole 167 exposes a portion of the data pad 155. Especially in the present invention, those contact holes 161, 163, 165 and 167 expose the first and second out-diffusion films D1 and D2. An inorganic material, such as silicon oxide ($SiO_2$) or silicon nitride ($SiN_x$), or an organic material, such as benzocyclobutene (BCB) or acrylic resin, or double layers thereof may be used as a material for the passivation layer 159.

Figure 6F:
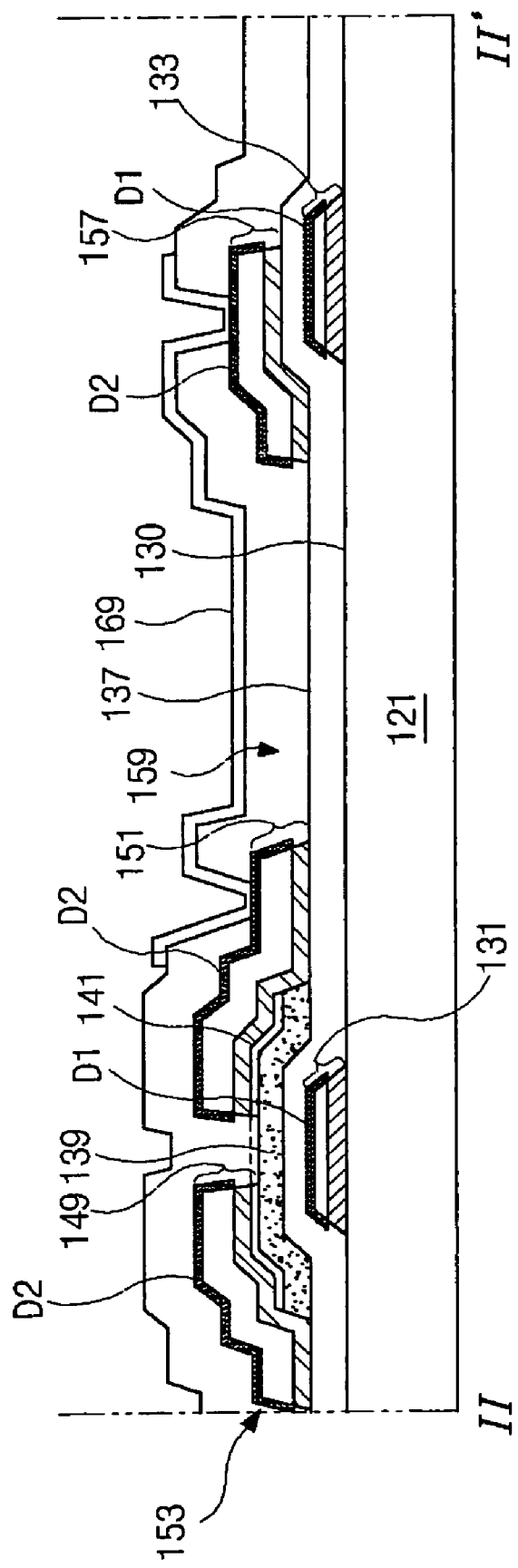
Figure 7F:
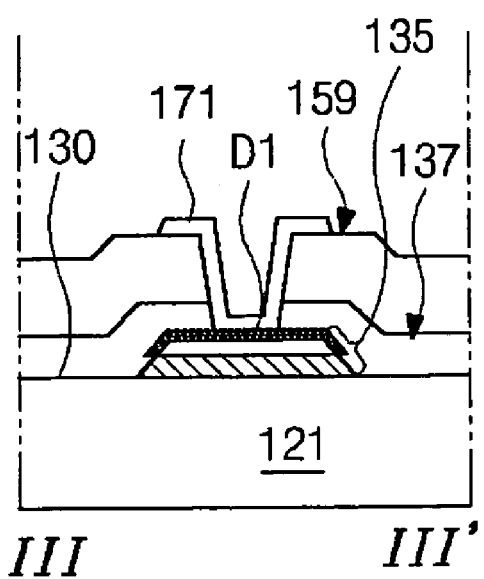
Figure 8F:
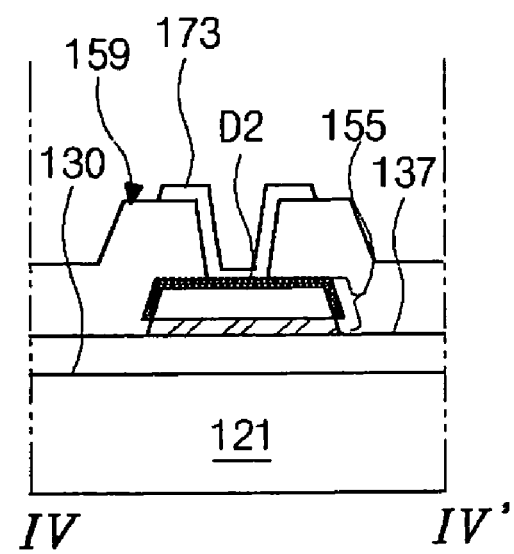

In FIGS. 6F, 7F and 8F, a transparent conductive material is deposited on the passivation layer 159 having the above-mentioned holes, and then patterned to form a pixel electrode 169, a gate pad terminal 171 and a data pad terminal 173. The transparent conductive material may be one of indium tin oxide (ITO) and indium zinc oxide (IZO). The pixel electrode 169 contacts the drain electrode 151 and the capacitor electrode 157, respectively, through the drain contact hole 161 and storage contact hole 163. Further, the gate pad terminal 171 contacts the gate pad electrode 135 through the gate pad contact hole 165, and the data pad terminal 173 contacts the data pad electrode 155 through the data pad contact hole 167.

In the above-mentioned present invention, because copper (Cu), which has a low resistance, is used for the gate electrode, the source and drain electrodes and the gate and data lines, the array substrate can have superior operating characteristics. For example, the thin film transistor can become a good array element in the array substrate. Furthermore, because the gate and data lines include copper, having a low electrical resistance, the signal delays are reduced in those lines. Therefore, if such a structure using the out-diffusion films is used in large liquid crystal panel, the LCD device can provide superior image quality.

In the above-mentioned process, the molybdenum (Mo) layer M is first formed on the substrate 121, and then the copper (Cu) layer C is formed on the molybdenum layer M. However, the accumulation order can be inversed. Namely, the copper layer C may first be formed on the substrate 121, and then the molybdenum (Mo) may be formed on the copper (Cu) layer C.

Figure 9A:
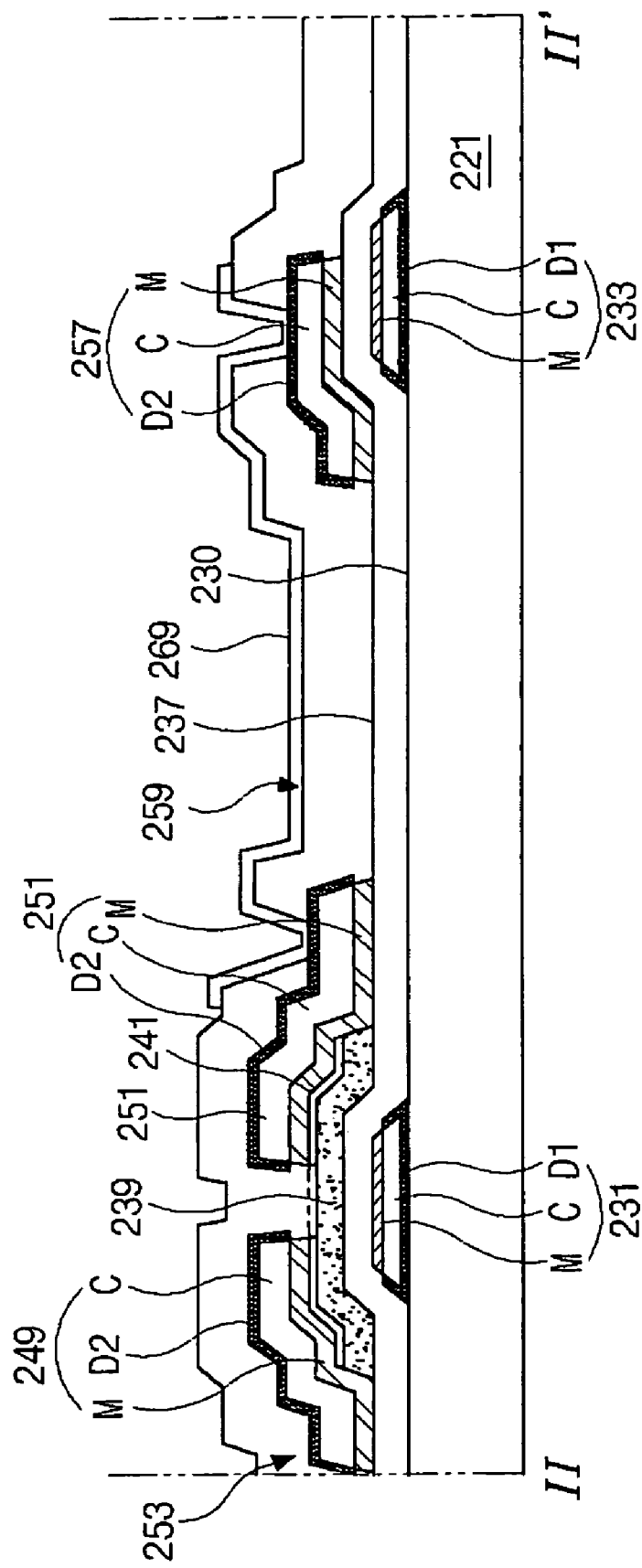
FIGS. 9A-9C are cross-sectional views illustrating a modification according to another exemplary embodiment of the present invention.
Figure 9B:
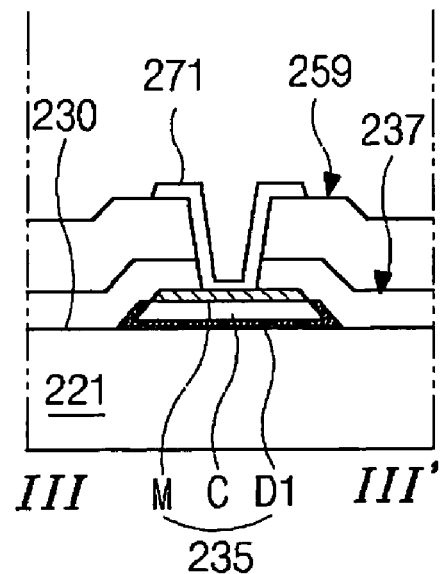
Figure 9C:
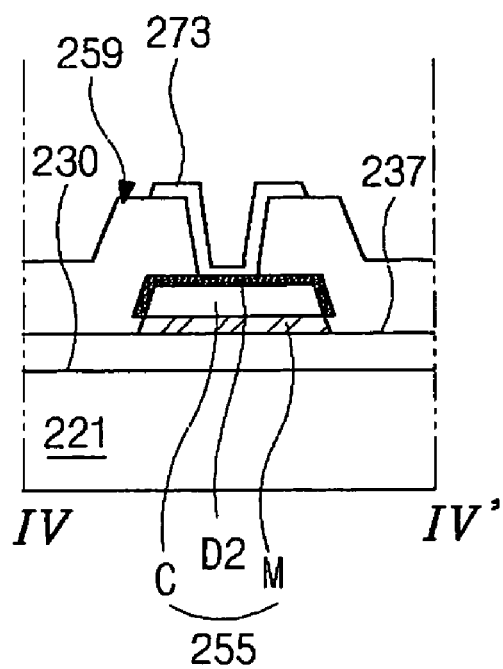

FIGS. 9A-9C are cross-sectional views illustrating a modification according to another exemplary embodiment of the present invention.

As illustrated in FIGS. 9A-9C, a gate electrode 231, a gate line 233 and a gate pad electrode 235 are formed on a substrate 221. The gate electrode 231, line 233 and pad electrode 235 have a double-layered structure consisting of a first metal C of copper (Cu) and a second metal M of molybdenum (Mo) or molybdenum (Mo) alloy that includes molybdenum (Mo) and at least one of tantalum (Ta), titanium (Ti), neodymium (Al), chromium (Cr), tungsten (W), nickel (Ni), aluminum (Al), and an alloy thereof. Unlike the previously-described embodiment, the copper layer C is first formed on the substrate 221, and the molybdenum (or molybdenum alloy) layer M is disposed on the copper layer C. By applying the heat treatment to the substrate 221 including the double-layered gate electrode 231, line 233 and pad electrode 235, a first out-diffusion film D1 is formed underneath the copper layer C with covering and surrounding the copper layer C. In this embodiment, the first out-diffusion film D1 is between the substrate 221 and the copper layer C, so that it helps the copper layer C to have the improved adhesion to the substrate 221.

As described hereinbefore, the gate electrode 231 extends from the gate line 233 and the gate pad electrode 235 is at the end of the gate line 233. In this embodiment of the present invention, the first and second metal layers C and M are sequentially and stably settled on the substrate 221 and firmly become the double layered gate electrode 231, line 233 and pad electrode 235 with the first out-diffusion film D1 between the substrate and the copper layer C.

After forming the first out-diffusion film D1, a gate insulation layer 237 is formed on the substrate 221 to cover the gate electrode 231, line 233 and pad electrode 235. As mentioned before, the gate insulation layer 237 may be an inorganic material, such as silicon nitride ($SiN_x$) or silicon oxide ($SiO_2$). Thereafter, an active layer 239 of amorphous (a-Si:H) and an ohmic contact layer 241 of $n^+$ doped amorphous silicon ($n^+$a-Si:H) are sequentially formed on the gate insulation layer 237, especially over the gate electrode 131.

Next, a source electrode 249, a drain electrode 251, a data line 253, a data pad electrode 255 and a capacitor electrode 257, all of which have a double-layered structure, are formed over the substrate 221. As was the case in the aforementioned embodiment, each of the source electrode 249, the drain electrode 251, the data line 253, the data pad electrode 255 and the capacitor electrode 257 has a molybdenum (or molybdenum alloy) layer M, a copper layer C and a second out-diffusion film D2. The copper layer C is on the upper surface of the molybdenum layer M, and the second out-diffusion film D2 is formed on outer surface of the copper layer C by applying the heat treatment.

The source electrode 249 extends from the data line 253 and contacts the ohmic contact layer 241. The drain electrode 251 is spaced apart from the source electrode 249 and also contacts the ohmic contact layer 241. As mentioned before, the data pad electrode 255 is at the end of the data line 253, and the capacitor electrode 257 is isolated, or shaped like an island, and disposed above the gate line 233. After forming the source and drain electrodes 249 and 251, a portion of the ohmic contact layer 241 between the source and drain electrodes 249 and 251 is removed to form a channel region.

Still referring to FIGS. 9A, 9B and 9C, a passivation layer 259, which is an insulation material, is formed all over the substrate 221 with covering the source and drain electrodes 249 and 251, the data line 253, the data pad electrode 255 and the storage capacitor 257. As mentioned before, the passivation layer 259 has contact holes, which expose portions of the drain electrode 251, the capacitor electrode 257, the gate pad 235, and the data pad 255, respectively. As a material for the passivation layer 259, an inorganic material, such as silicon oxide ($SiO_2$) or silicon nitride ($SiN_x$), or an organic material, such as benzocyclobutene (BCB) or acrylic resin, or double layers thereof may be used.

After forming the passivation layer 259 having the contact holes, a transparent conductive material is deposited on the passivation layer 259, and then patterned to form a pixel electrode 269, a gate pad terminal 271 and a data pad terminal 273. The transparent conductive material is one of indium tin oxide (ITO) and indium zinc oxide (IZO). The pixel electrode 269 contacts the drain electrode 251 and the capacitor electrode 257, respectively, through the contact holes. Further, the gate pad terminal 271 contacts the gate pad 235, and the data pad terminal 273 contacts the data pad 255. Accordingly, the array substrate of the second embodiment is complete.

In the second exemplary embodiment of the present invention, because the first out-diffusion film D1 is formed between the substrate 221 and the copper layer C, the double layered gate electrode 231, line 233 and pad electrode 235 can be stably and firmly formed over the substrate 221.

According to the present invention, the present invention has the following advantages. First, unlike the related art that uses aluminum, the thin film transistor of the present invention has improved characteristics because the copper layer of the source and drain electrodes do not contact the active layer and/or the ohmic contact layer. Second, because molybdenum is diffused along on the surface of the copper layer by the heat treatment, the adhesion between the copper layer and the insulator and/or between the copper layer and the substrate is dramatically increased. Third, because copper (Cu), which has a low resistance, is used for the lines and electrodes, the array substrate can be large in size without suffering from the signal delay such described with respect to the related art. Fourth, because both copper and molybdenum layers of the double-layered metal layer are simultaneously etched by the same etching solution, the fabrication process time can be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of forming an array substrate for use in a liquid crystal display device, comprising:
   forming a gate electrode, a gate line and a gate pad electrode on a substrate, wherein all of the gate electrode, the gate line and the gate pad electrode have a double-layered structure including a first barrier metal layer and a first copper layer;
   applying heat to the double-layered gate electrode, line and pad electrode so as to form a first out-diffusion film covering and surrounding the first copper layer;
   forming a gate insulation layer on the substrate to cover the gate electrode, gate line and gate pad electrode which include the first barrier metal layer, the first copper layer and the first out-diffusion film;
   forming an active layer and an ohmic contact layer sequentially on the gate insulation layer and over the gate electrode;
   forming a data line, source and drain electrodes and a data pad electrode, wherein the data line is on the gate insulation layer and crossed the gate line, wherein the source and drain electrodes contact the ohmic contact layer, wherein the data pad electrode is disposed on the gate insulation layer, and wherein all of the data line, the source and drain electrodes, the capacitor electrode and the data pad electrode have a double-layered structure including a second barrier metal layer and a second copper layer;
   applying heat to the double-layered data line, source and drain electrodes and data pad electrode so as to form a second out-diffusion film that covers and surrounds the second copper layer;
   forming a passivation layer formed on the gate insulation layer to cover the double-layered data line, source and drain electrodes, and data pad electrode all of which have the second barrier metal layer, the second copper layer and the second out-diffusion film, wherein the passivation layer has a drain contact hole exposing the drain electrode, a gate pad contact hole exposing the gate pad electrode, and a data pad contact hole exposing the data pad electrode; and
   forming a pixel electrode, a gate pad terminal and a data pad terminal on the passivation layer using a transparent conductive material.

2. The method according to claim 1, the first and second barrier metal layers includes molybdenum.

3. The method according to claim 1, wherein each of the first and second barrier metal layers is a molybdenum-alloy layer that includes molybdenum and at least one of titanium (Ti), tantalum (Ta), chromium (Cr), nickel (Ni), neodymium (Nd), indium (In) and aluminum (Al).

4. The method according to claim 1, wherein the first and second out-diffusion films are metal alloy films of molybdenum and copper which are formed at a temperature of about 200 degrees Celsius, and each has a thickness of 1 to 100 angstroms.

5. The method according to claim 1, wherein the first barrier metal layer is disposed on a surface of the substrate, the first copper layer is disposed on the first barrier metal layer, and the first out-diffusion film is disposed along on the outer surface of the first copper layer.

6. The method according claim 1, wherein the first copper layer is on the substrate, the first barrier metal layer is on the first copper layer, and the first out-diffusion film is between the substrate and the first copper layer.

7. The method according to claim 1, wherein the gate electrode extends from the gate line, the gate pad electrode is at an end of the gate line, the source electrode extends from the data line, the drain electrode is spaced apart from the source electrode, and the data pad electrode is at an end of the data line.

8. The method according to claim 1, wherein the pixel electrode is disposed in a pixel region defined by the crossing of the gate and data lines, wherein said pixel electrode contacts the drain electrode through the drain contact hole, wherein the gate pad terminal contacts the gate pad through the gate pad contact hole, and wherein the data pad terminal contacts the data pad through the data pad contact hole.

9. The method according to claim 1, wherein forming the data line, the source and drain electrodes and the data pad electrode includes forming a double-layered capacitor electrode on the gate insulating layer and over the portion of the gate line, and wherein the double-layered capacitor electrode has the second barrier metal layer and the second copper layer.

10. The method according to claim 9, wherein applying heat to the data line, source and drain electrode and data pad electrode includes applying the heat to the double-layered capacitor electrode so as to form a second out-diffusion film that covers and surrounds the second copper layer, wherein the capacitor electrode is connected in parallel with the pixel electrode through a contact hole formed in the passivation layer.

* * * * *